US012450289B2

(12) United States Patent
Saha et al.

(10) Patent No.: US 12,450,289 B2
(45) Date of Patent: Oct. 21, 2025

(54) DATASET PREPARATION

(71) Applicant: INTERNATIONAL BUSINESS MACHINES CORPORATION, Armonk, NY (US)

(72) Inventors: Diptikalyan Saha, Bangalore (IN); Aniya Aggarwal, New Delhi (IN); Swagatam Haldar, Kolkata (IN); Devika Sondhi, Noida (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/240,866

(22) Filed: Aug. 31, 2023

(65) Prior Publication Data
US 2025/0077577 A1 Mar. 6, 2025

(51) Int. Cl.
*G06F 16/901* (2019.01)
*G06F 7/14* (2006.01)

(52) U.S. Cl.
CPC ........... *G06F 16/901* (2019.01); *G06F 7/14* (2013.01)

(58) Field of Classification Search
CPC ................. G06F 16/901; G06F 7/14
USPC ............................................. 707/741
See application file for complete search history.

(56) References Cited

U.S. PATENT DOCUMENTS

| 8,375,014 | B1* | 2/2013 | Brocato | G06F 16/213 |
| | | | | 707/705 |
| 9,201,927 | B1* | 12/2015 | Zhang | G06F 40/30 |
| 9,390,176 | B2 | 7/2016 | Scriffignano | |
| 10,565,222 | B2* | 2/2020 | Murray | G06F 16/2456 |

(Continued)

FOREIGN PATENT DOCUMENTS

| CN | 104346358 A | * | 2/2015 | ....... G06F 17/30067 |
| CN | 105824872 A | * | 8/2016 | ........... G06F 16/243 |

(Continued)

OTHER PUBLICATIONS

Wei, Tingting et al.; A semantic approach for text clustering using WordNet and lexical chains; Expert Systems with Applications, vol. 42; Issue 4; Mar. 2015; pp. 2264-2275.

(Continued)

*Primary Examiner* — Phuong Thao Cao
(74) *Attorney, Agent, or Firm* — Eric Chesley, Esq.; Heslin Rothenberg Farley & Mesiti P.C.; George S. Blasiak, Esq.

(57) ABSTRACT

Methods, computer program products, and systems are presented. The method computer program products, and systems can include, for instance: processing a plurality of raw datasets for generating index metadata and associating one or more index defining the index metadata to respective ones of the plurality raw datasets, wherein the respective ones of the plurality of raw datasets define respective metadata augmented datasets by the associating of the one or more index thereto; examining augmented datasets of the metadata augmented datasets in dependence on metadata of (Continued)

the index metadata and in dependence on user defined input data; and merging first and second ones of the augmented datasets in dependence on the examining augmented datasets, wherein the merging first and second ones of the augmented datasets in dependence on the examining augmented datasets is performed in support of preparing a production dataset.

20 Claims, 10 Drawing Sheets

(56) References Cited

U.S. PATENT DOCUMENTS

| | | | |
|---|---|---|---|
| 10,628,930 B1* | 4/2020 | Periaswamy | A61B 6/5235 |
| 10,650,000 B2* | 5/2020 | Oberbreckling | G06F 16/248 |
| 10,997,244 B2 | 5/2021 | Rusell | |
| 11,500,865 B1* | 11/2022 | Wang | G06N 3/045 |
| 11,726,994 B1* | 8/2023 | Wang | G06F 16/243 707/769 |
| 11,860,910 B2* | 1/2024 | Kimura | G06F 16/221 |
| 11,983,156 B2* | 5/2024 | Alford | G06V 40/20 |
| 2008/0228820 A1* | 9/2008 | Kenedy | G16H 40/63 |
| 2009/0043795 A1* | 2/2009 | Kenedy | G16H 50/20 |
| 2009/0055445 A1* | 2/2009 | Liu | G06F 16/258 707/999.203 |
| 2010/0100804 A1* | 4/2010 | Tateishi | G06F 16/21 715/225 |
| 2010/0121706 A1* | 5/2010 | Arena | G06Q 40/04 705/37 |
| 2017/0024640 A1* | 1/2017 | Deng | G06N 3/04 |
| 2017/0299558 A1* | 10/2017 | Stevens | H01J 49/0036 |
| 2018/0096000 A1* | 4/2018 | Harrison | G06F 16/24578 |
| 2020/0034371 A1* | 1/2020 | Reynolds | G06F 16/256 |
| 2020/0177544 A1* | 6/2020 | McCarty | H04L 63/0209 |
| 2020/0210417 A1* | 7/2020 | Murray | G06F 16/2456 |
| 2020/0242111 A1* | 7/2020 | Oberbreckling | G06F 16/254 |
| 2020/0278986 A1* | 9/2020 | Guha | G06N 5/04 |
| 2020/0342014 A1* | 10/2020 | Kumar | G06F 16/338 |
| 2020/0356851 A1 | 11/2020 | Li | |
| 2021/0029166 A1* | 1/2021 | Krishna | G06N 20/00 |
| 2021/0133169 A1* | 5/2021 | Kolli | G06F 16/24573 |
| 2021/0141838 A1* | 5/2021 | Atallah | G06F 16/9024 |
| 2021/0334275 A1* | 10/2021 | Smart | G06F 16/2456 |
| 2021/0349884 A1* | 11/2021 | Aaron | G06F 40/40 |
| 2022/0164347 A1* | 5/2022 | Akyamac | G06N 5/025 |
| 2022/0269663 A1* | 8/2022 | Raphael | G06F 16/2282 |
| 2023/0088290 A1* | 3/2023 | Mengwasser | H04W 64/003 455/66.1 |
| 2023/0153312 A1* | 5/2023 | Jacob | G06F 16/256 |
| 2023/0273911 A1* | 8/2023 | Dong | G06F 16/2465 707/741 |
| 2023/0368097 A1* | 11/2023 | Kumar | G06F 16/2465 |

FOREIGN PATENT DOCUMENTS

| | | | | |
|---|---|---|---|---|
| CN | 112420125 A | * | 2/2021 | G06K 9/6256 |
| CN | 113761297 A | * | 12/2021 | G06F 16/901 |
| CN | 114328914 A | * | 4/2022 | |
| CN | 116467355 A | * | 7/2023 | |
| KR | 20210088367 A | * | 7/2021 | |

OTHER PUBLICATIONS

Saha, Diptikalyan et al.; ATHENA: An Ontology-Driven System for Natural Language Querying over Relational Data Stores; Proceedings of VLDB Endowment, vol. 9, No. 12; Aug. 1, 2016; pp. 1209-1220.

Github. "Z3Prover/z3", retrieved from web https://web.archive.org/web/20230818224556/https://github.com/Z3Prover/z3, dated Aug. 18, 2023, 6 pages.

Xu et al., "Modeling Tabular Data using Conditional GAN", arXiv: 1907.00503v2 [cs.LG], Oct. 28, 2019, 15 pages.

* cited by examiner

```
                                                    ┌─ 3102
    THE FOLLOWING GROUPS OF DATASETS QUALIFY

RANK  GROUP              SCORE   DATASETS
3122─▶  1    GROUP A, VERSION 2  0.91   TABLE1, TABLE2

3124─▶  2    GROUP B             0.84   TABLE2, TABLE4

3126─▶  3    GROUP A, VERSION 1  0.75   TABLE1, TABLE2
```

FIG. 3B

DATASET PREPARATION

BACKGROUND

Embodiments herein relate generally to datasets and particularly to preparation of a dataset from raw datasets.

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g., in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: processing a plurality of raw datasets for generating index metadata and associating one or more index defining the index metadata to respective ones of the plurality raw datasets, wherein the respective ones of the plurality of raw datasets define respective metadata augmented datasets by the associating of the one or more index thereto; examining augmented datasets of the metadata augmented datasets in dependence on metadata of the index metadata and in dependence on user defined input data; and merging first and second ones of the augmented datasets in dependence on the examining augmented datasets, wherein the merging first and second ones of the augmented datasets in dependence on the examining augmented datasets is performed in support of preparing a production dataset.

In another aspect, a computer program product can be provided. The computer program product can include a computer readable storage medium readable by one or more processing circuit and storing instructions for execution by one or more processor for performing a method. The method can include, for example: processing a plurality of raw datasets for generating index metadata and associating one or more index defining the index metadata to respective ones of the plurality raw datasets, wherein the respective ones of the plurality of raw datasets define respective metadata augmented datasets by the associating of the one or more index thereto: examining augmented datasets of the metadata augmented datasets in dependence on metadata of the index metadata and in dependence on user defined input data; and merging first and second ones of the augmented datasets in dependence on the examining augmented datasets, wherein the merging first and second ones of the augmented datasets in dependence on the examining augmented datasets is performed in support of preparing a production dataset.

In a further aspect, a system can be provided. The system can include, for example a memory. In addition, the system can include one or more processor in communication with the memory. Further, the system can include program instructions executable by the one or more processor via the memory to perform a method. The method can include, for example: processing a plurality of raw datasets for generating index metadata and associating one or more index defining the index metadata to respective ones of the plurality raw datasets, wherein the respective ones of the plurality of raw datasets define respective metadata augmented datasets by the associating of the one or more index thereto: examining augmented datasets of the metadata augmented datasets in dependence on metadata of the index metadata and in dependence on user defined input data; and merging first and second ones of the augmented datasets in dependence on the examining augmented datasets, wherein the merging first and second ones of the augmented datasets in dependence on the examining augmented datasets is performed in support of preparing a production dataset.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 3A-B depicts a user interface for display on a display of a UE device according to one embodiment:

DETAILED DESCRIPTION

Figure 1:
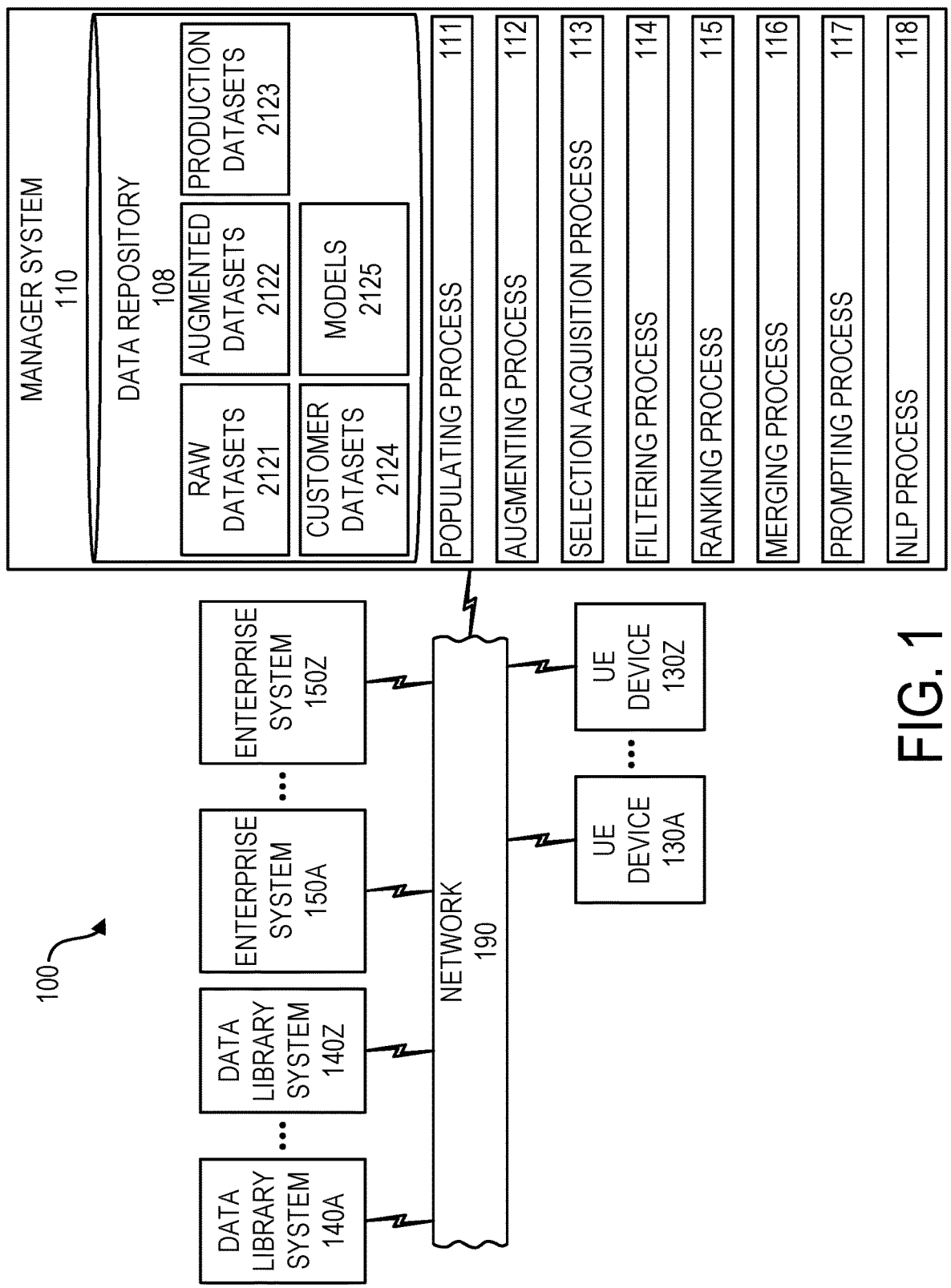
FIG. 1 is a system block diagram of a system having a manager system, enterprise systems, data library systems and user interface devices according to one embodiment.

System 100 for use in preparing production data is shown in FIG. 1. System 100 can include manager system 110, having data repository 108 data library systems 140A-140Z, enterprise systems 150A-150Z and UE devices 130A-130Z. Manager system 110, data library systems 140A-140Z, enterprise systems 150A-150Z and UE devices 130A-130Z can be computing node based devices, each having one or more computing node. Manager system 110, data library systems 140A-140Z, enterprise systems 150A-150Z and UE devices 130A-130Z can be connected together with one another via network 190. Network 190 can be a physical network and/or a virtual network. A physical network can be, for example, a physical telecommunications network connecting numerous computing nodes or systems, such as computer servers and computer clients. A virtual network can, for example, combine numerous physical networks or parts thereof into a logical virtual network. In another example, numerous virtual networks can be defined over a single physical network. In the context of data library systems 140A-140Z, enterprise systems 150A-150Z and UE devices 130A-130Z, "Z" can refer to any arbitrary integer.

Manager system 110 can be in one embodiment external to each of data library systems 140A-140Z, enterprise systems 150A-150Z and UE devices 130A-130Z. In another embodiment, manager system 110 can be collocated with one or more instance of UE devices 130A-130Z, one or more instance of data library systems 140A-140Z and one or more instance of enterprise systems 150A-150Z. Data repository 108 can store various data.

Manager system 110, instances of enterprise systems 150A-150Z, data library systems 140A-140Z and instances of UE devices 130A-130Z can be computing node based systems, i.e., each having one or more computing node.

Data repository 108 in raw datasets area 2121 can store raw datasets. Datasets can be table based dataset. A dataset herein can include one or more table. Raw dataset data can include data in its raw form from one or more data library systems 140A-140Z. Embodiments herein recognize that emerging applications can consume vast amount of data. In one example, an application program interface (API) for decision processing can process vast amounts of data and can be error prone as a result of complexity. In one example an API can be used to discern, e.g., credits/and or adapted communications to certain classifications of users. Embodiments herein recognize that challenges persist in testing such APIs. One challenge is that test data to testing such APIs may not emulate production environment data accurately. In such a situation, a failure mode may not be observed until the API is placed into production. In another example, machine learning systems can benefit from training that is performed with use of tens, hundreds, thousands or millions of rows of data from one or more datasets. Embodiments herein recognize, however, that challenges exist in use of raw data provided by data providers. Library systems 140A-140Z can be operated by dataset providers who provide raw data for use in various applications. In one example, raw data can exhibit trends which otherwise could productively train a predictive model but errors such as trend loss attributable to loss of realistic data in the assembly of training data can prevent detection of the trend.

Data repository 108 in augmented datasets area 2122 can store augmented datasets. Augmented datasets can be datasets that are augmented by processes herein to include metadata. Metadata, in one example, can take the form of indexes that are applied and associated to datasets. Indexes defining index metadata can include such indexes as a column and datatype index, a semantic tag index and/or a column association index. Manager system 110 for providing an augmented dataset can associate to a raw dataset one or more of a column and datatype index, a semantic tag index and/or a column association index. Manager system 110 can process metadata of index metadata when preparing a production dataset for use in an application.

Data repository 108 in production datasets area 2123 can include cleaned datasets prepared by processes herein.

Data repository 108 in customer datasets area 2124 can include customer datasets. In some embodiments, manager system 110 can process attributes of customer datasets for use in preparing a production dataset. In some embodiments, manager system 110 can process attributes of the customer dataset for purposes of emulating those attributes and then can perform processes herein with respect to raw datasets of raw dataset area and/or augmented marked up and augmented datasets for purposes of increasing volume of a customer dataset.

In models area 2125, data repository 108 can store predictive models trained by training data of a production dataset produced by methods herein. In models area 2125, data repository 108 can store predictive models trained for predicting performance of a production dataset produced by methods herein.

Embodiments herein recognize that certain applications, including various machine learning applications, can benefit from training with use of an increased volume of training data.

Manager system 110 can run various processes. Manager system 110 running populating process 111 can populate raw datasets accumulated into raw datasets area 2121. Manager system 110 performing populating process 111 can include manager system 110 iteratively querying data library systems 140A-140Z for return of raw datasets. On querying of data library systems 140A-140Z, manager system 110 can acquire raw datasets for storage into raw datasets area 2121.

Manager system 110 running augmenting process 112 can include manager system 110 augmenting raw datasets that have accumulated in raw datasets area 2121 by operation of populating process 111. Manager system 110 running augmenting processes 112 can add metadata to raw datasets for the benefit of subsequent processing raw datasets now augmented with metadata. Manager system 110 running augmenting process 112 can add and associate to raw datasets index metadata. Indexes defining index metadata can include such indexes as a column and datatype index, a semantic tag index and/or a column association index. Manager system 110 for providing an augmented dataset can associate to a raw dataset one or more of a column and datatype index, a semantic tag index and/or a column association index. Manager system 110 can process metadata of index metadata when preparing a production dataset for use in an application.

Manager system 110 running selection acquisition process 113 can obtain administrator user defined search input data that specifies parameter values of a production dataset being prepared by methods herein. Manager system 110 running selection acquisition process 113 can include manager system 110 reading input selection query data values input by an administrator user into a user interface.

Manager system 110 running filtering process 114 can include manager system 110 filtering out unqualified datasets and identifying qualified sets of augmented datasets that can be processed together for output of production dataset. Manager system 110 running filtering process 114 can include manager system 110 analyzing metadata of index metadata defining an augmented dataset, i.e., the described index metadata and can also include manager system 110 analyzing administrator user defined search input data values specifying parameter values of a production dataset being produced by methods herein.

Manager system 110 running ranking process 115 can include manager system 110 ranking sets of datasets identified as being valid qualified datasets for processing together by the performance of filtering process 114.

Manager system 110 running merging process 116 can merge datasets together in dependence on a result of the filtering process 114, and the ranking process 115. Manager system 110 running merging process 116 can produce a production database having attributes aligned with a customer target.

Manager system 110 running prompting process 117 can include manager system 110 generating and presenting prompting data for prompting action on the part of an administrator user. Prompting data can include, e.g., prompting data that prompts an administrator user to select and enter search input user defined data that defines parameter values of a targeted production dataset. Prompting data can include, e.g., prompting data that prompts an administrator user to select a group of datasets for merging.

Manager system 110 running natural language processing (NLP) process 118 can include manager system 110 processing text based data for determining one or more NLP output parameter of a message. NLP process 118 can include one or more of a topic classification process that determines topics of messages and outputs one or more topic NLP output parameter, a sentiment analysis process which determines sentiment parameter for a message, e.g., polar sentiment NLP output parameters, "negative," "positive," and/or non-polar NLP output sentiment parameters, e.g., "anger," "disgust," "fear," "joy," and/or "sadness" or other classification process for output of one or more other NLP output parameters e.g., one of more "social tendency" NLP output parameter or one or more "writing style" NLP output parameter.

By running of NLP process 118 manager system 110 can perform a number of processes including one or more of (a) topic classification and output of one or more topic NLP output parameter for a received message (b) sentiment classification and output of one or more sentiment NLP output parameter for a received message or (c) other NLP classifications and output of one or more other NLP output parameter for the received message.

Topic analysis for topic classification and output of NLP output parameters can include topic segmentation to identify several topics within a message. Topic analysis can apply a variety of technologies e.g., one or more of Hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment sentiment analysis can classify the polarity of a given text as to whether an expressed opinion is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

Manager system 110 running NLP process 118 can include manager system 110 returning NLP output parameters in addition to those specification topic and sentiment, e.g., can provide sentence segmentation tags, and part of speech tags. Manager system 110 can use sentence segmentation parameters to determine e.g., that an action topic and an entity topic are referenced in a common sentence for example.

Manager system 110 running NLP process 118 can include manager system 110 training and querying a machine learning trained word2vec clustering predictive model. Manager system 110 running NLP process 118 can include manager system using word2vec models to produce word embeddings. In one embodiment, these models are neural networks that are trained to reconstruct linguistic contexts of words. Word2vec takes as its input a large corpus of text and produces a vector space, typically of several hundred dimensions, with each unique word in the corpus being assigned a corresponding vector in the space. Word vectors are positioned in the vector space such that words that share common contexts in the corpus are located in close proximity to one another in the space.

Manager system 110 running NLP process 118 can include manager system 110 training and querying a machine learning trained statistical language model (SLM). An SLM is a probabilistic description of the constraints on word order found in a given language. An SLM can be based on the N-gram principle, where the probability of the current word is calculated on the basis of the identities of the immediately preceding (N-1) words. Robust speech recognition solutions using an SLM use an N-gram where N is greater than two, meaning trigrams and greater are generally used. An SLM is not manually written, but is trained from a set of examples that models expected speech, where the set of examples can be referred to as a speech corpus. SLMs can produce results for a broad range of input, which can be useful for speech-to-text recognizing words, for free speech dictation and for processing input including unanticipated and extraneous elements, which are common in natural speech.

Figure 2:
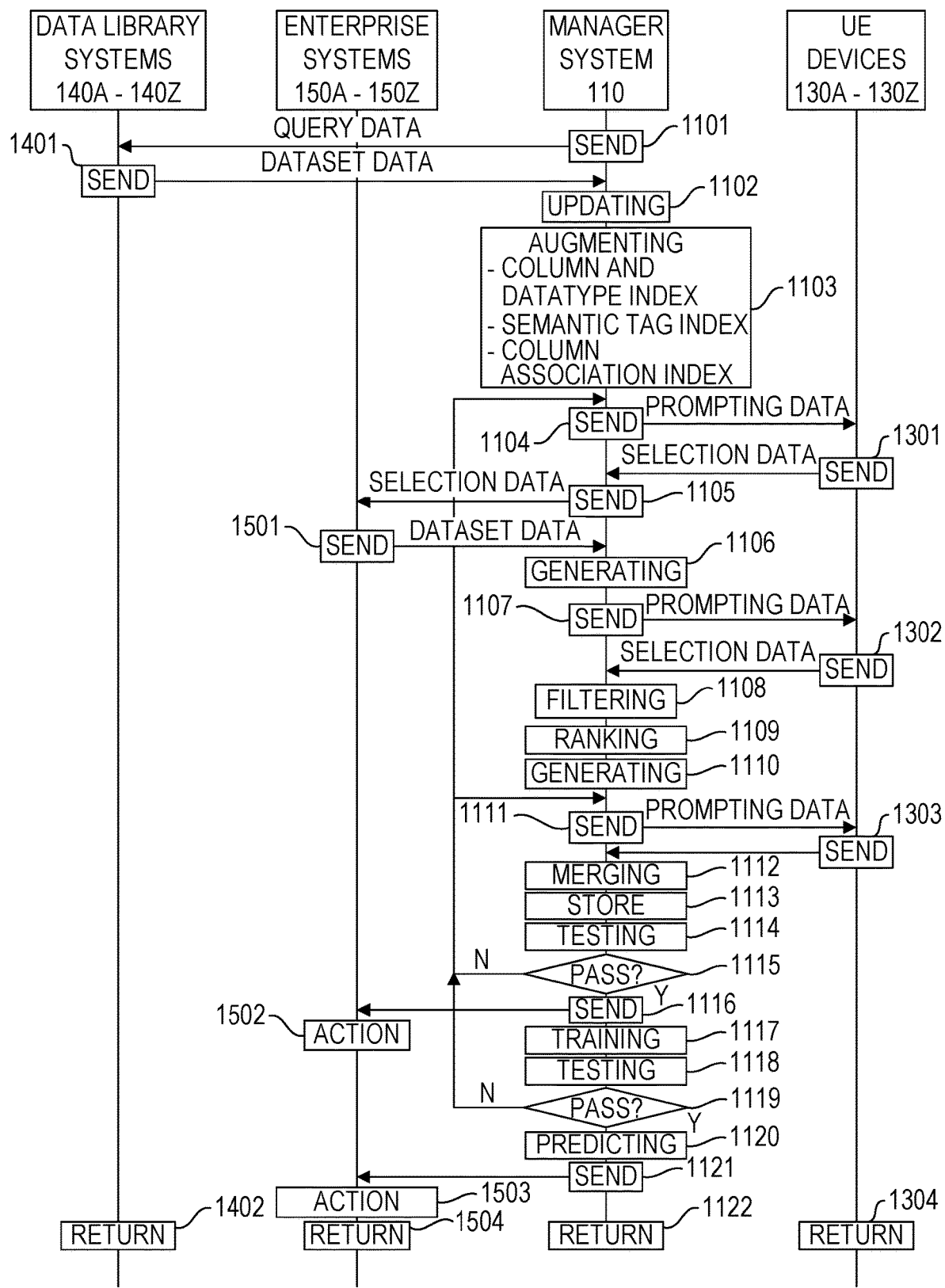
FIG. 2 is a flow chart depicting a method for performance of the manager system interoperating with enterprise systems, data library systems and UE devices according to one embodiment.

FIG. 2 illustrates an example of manager system 110 interoperating with data library systems 140A-140Z, enterprise systems 150A-150Z and UE devices 130A-130Z.

Manager system 110 at send block 1101 can be sending query data for receipt by data library systems 140A-140Z. In response to the receipt of the data library of the query data, data library systems 140A-140Z can be sending dataset data to manager system 110. The dataset data can include table based datasets. In response to the receipt of the dataset data, manager system 110 at updating block 1102 can perform updating of raw datasets stored in raw datasets area 2121. In response to completing updating at updating block 1102, manager system 110 can proceed to block 1103.

At block 1103, manager system 110 can perform augmenting of received raw datasets received in response to the sending at block 1401. In one embodiment, manager system 110 can perform augmenting of received datasets responsively to the receipt of such datasets. While data repository 108 depicts raw datasets area 2121 and augmented datasets area 2122, manager system 110, in one embodiment, can augment each newly received raw dataset in real time on receipt thereof and can be absent of raw dataset stored in raw datasets area 2121. In another embodiment, data repository 108 can maintain separate datasets in both raw dataset area 2121 and in augmented datasets area 2122.

At augmenting block 1103, manager system 110 can generate index metadata for association to received raw datasets to define augmented datasets augmented to include index metadata. For generating index metadata for association to raw datasets manager system 110 can process the raw datasets. The metadata can take the form of index metadata. In performing augmenting of received raw dataset, manager system 110 can add one or more index defining index metadata to a received raw dataset.

Index metadata can include (a) column and datatype index metadata, (b) semantic tag index metadata, and/or (c) column association metadata.

For generating (a) column and type index metadata, manager system 110 can record for each new incoming dataset metadata that specifies for each column the dataset (i) column name, and (ii) datatype of the column. The data datatype of a column can specify, e.g.: int, float, string, category, etc. Manager system 110 can store the column name and datatype in index format.

Table A below depicts manager system 110 producing column and datatype index metadata for a dataset.

TABLE A (Table, Field, Type) Index

```
{
    "dataset": "-covid19-daily-report",
    "file": "Covid19_every_Country_daily_report,
    "columns": [
        "active",
        "confirmed",
        "Country",
        "date",
        "deaths",
        "latitude",
        "longitude",
        "recovered",
        "continent"
    ],
    "base_types": [
        "float",
        "float",
        "text",
        "date",
        "float",
        "float",
        "float",
        "float",
        "text"
    ]
},
```

For generating (b) semantic tag index metadata, manager system 110 can subject each incoming raw dataset to natural language processing by NLP process 118. For generating semantic tag index metadata, manager system 110 can subject an incoming dataset to natural language processing for extraction of topics associated to (i) the dataset, and (ii) individual columns. Manager system 110 can rank the extracted topics. Manager system 110 can extract the dataset topics by subjecting table names, column names and/or column values to natural language processing. Manager system 110 can store the recorded index metadata in index format.

For generating semantic tag index metadata, manager system 110 can subject an incoming dataset to natural language processing for extraction of keywords associated to (i) the dataset, and (ii) individual columns. Manager system 110 can rank the extracted keywords in dependence on column name or column value frequency. Manager system 110 can extract the dataset keywords by subjecting table names column names and/or column values to natural language processing. Manager system 110 can store the recorded index metadata in index format.

Figure 4A:
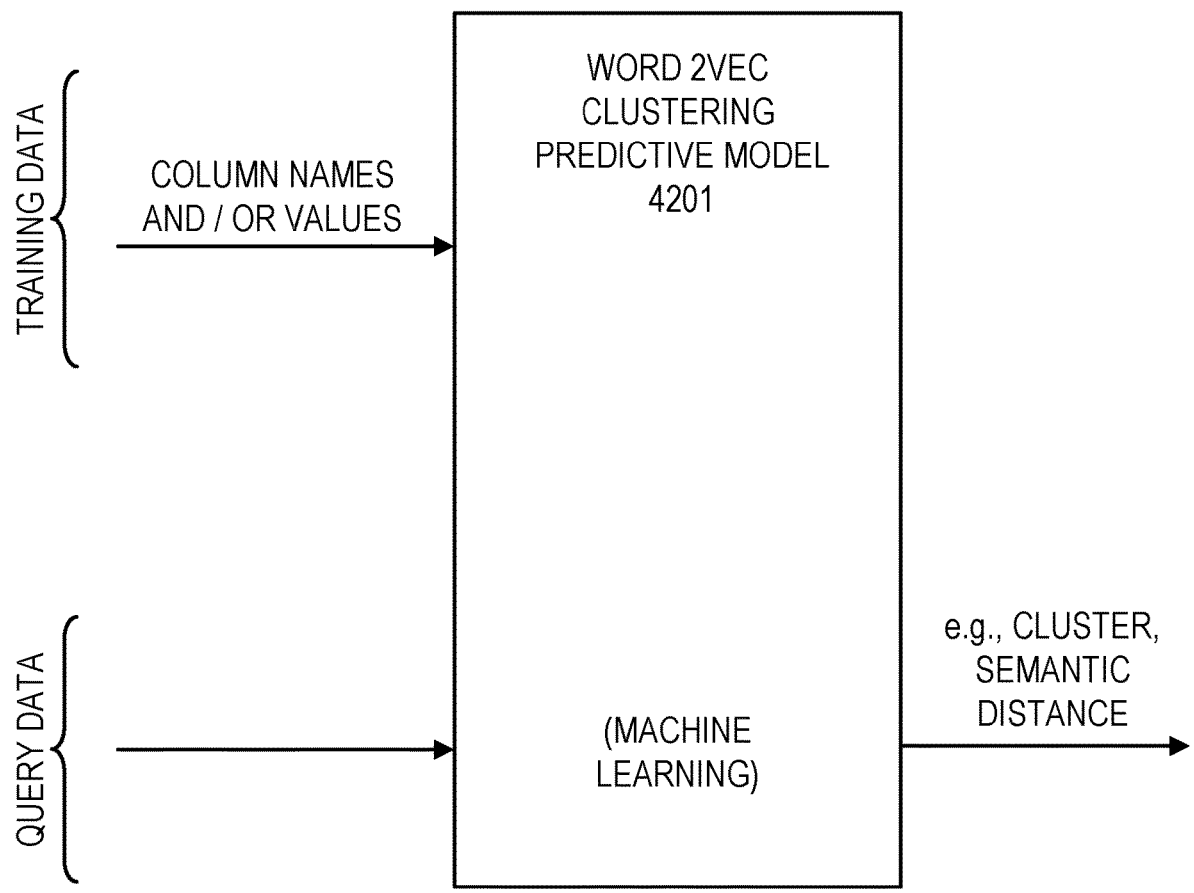
FIG. 4A-4B depicts a word2vec machine learning model, according to one embodiment.

For generating (b) semantic tag index metadata, manager system 110 can train a word2vec clustering predictive model 4201 as shown in FIG. 4A by machine learning. For each new incoming dataset, manager system 110 can extract column names and/or column values for training a clustering machine learning model defining a word2vec clustering predictive model 4201. Word2vec clustering machine learning model 4201 can be trained by iterations of training data, e.g., column names and/or column values, extracted from datasets added to a corpus of datasets, and once trained, word2vec clustering predictive model 4201 can respond to query data. Word2vec clustering predictive model 4201 can be queried for return, e.g., of identified clusters of words, and Euclidian distances between words.

Figure 4B:
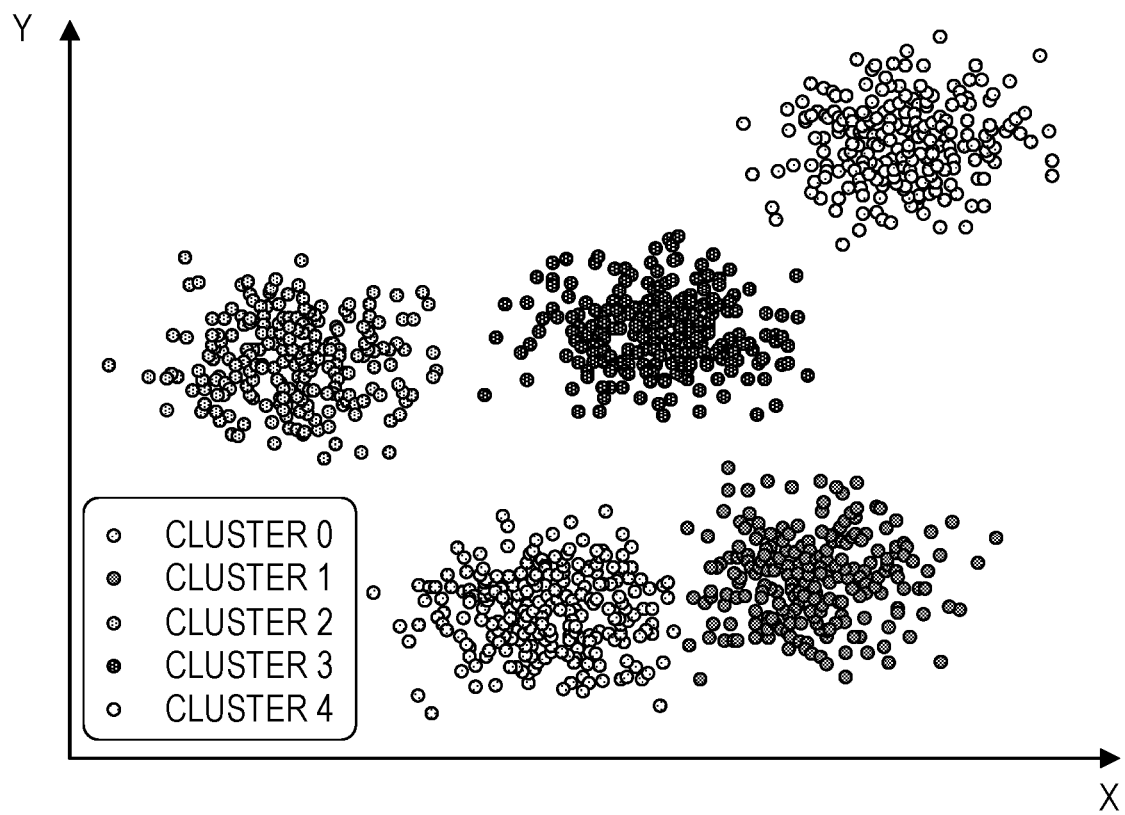

In FIG. 4B there are depicted dataset extracted words mapped as vectors. The mapped words can define clusters, and each word includes a measured distance to each other word in Euclidian space. For generating (b) semantic tag index metadata, manager system 110 can assign and record each column name and each column value to a cluster as depicted in FIG. 4B identified by a cluster identifier. Using the trained word2vec clustering map as depicted in FIG. 4B, manager system 110 can extract a Euclidian distance between any two words in a corpus defined by the set of archived datasets. Manager system 110 can record as semantic tag index data cluster classifications of column names and/or column values. Manager system 110 can record as semantic tag index data word2vec vector values of column names and/or column values. Manager system 110 can store the recorded index metadata in index format.

Figure 4C:
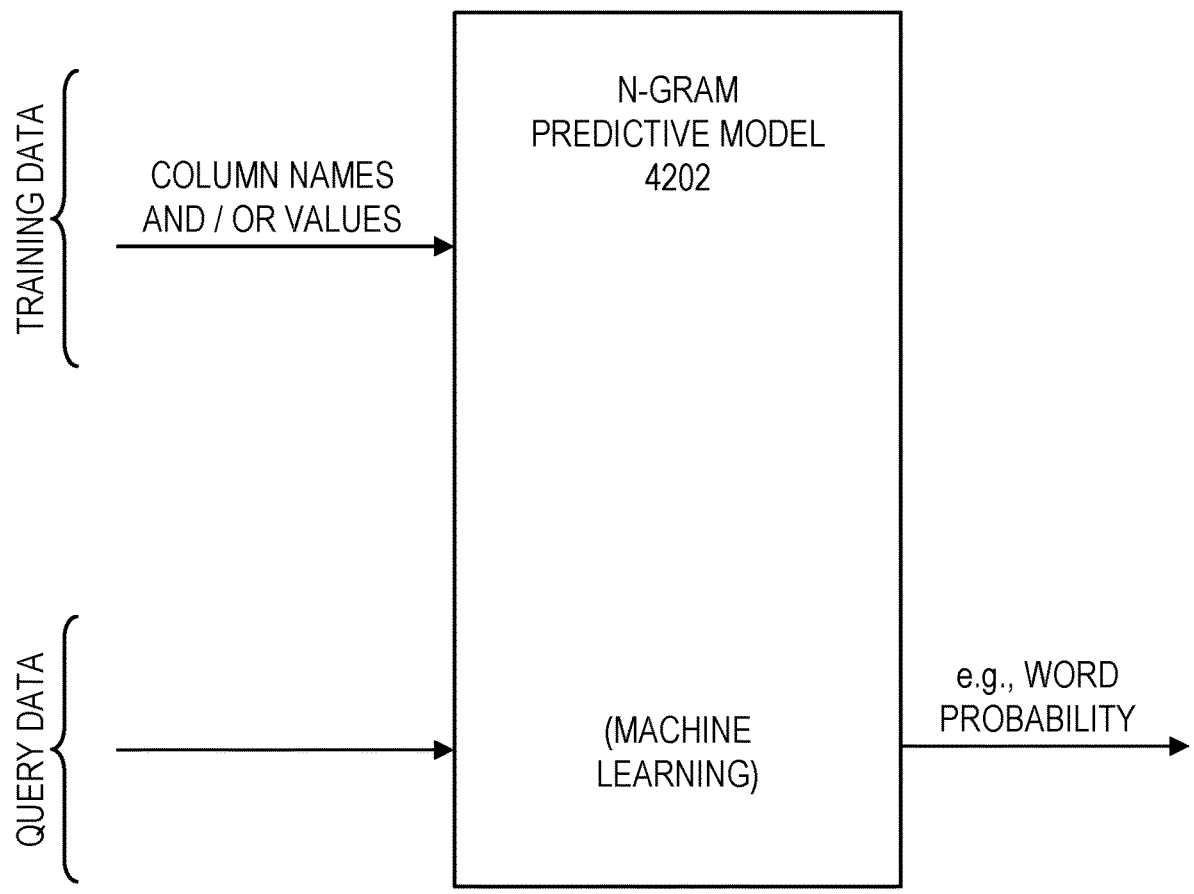
FIG. 4C depicts an N-gram machine learning model, according to one embodiment.

For generating (b) semantic tag index metadata, manager system 110 can train an N-gram predictive model 4202 as shown in FIG. 4C by machine learning. For each new incoming dataset, manager system 110 can extract column names and/or column values for training N-gram predictive model 4202. N-gram predictive model 4202 can be trained by iterations of training data, e.g., column names and/or column values, extracted from datasets added to a corpus of datasets, and once trained, N-gram predictive model 4202 can respond to query data. N-gram predictive model 4202 can be queried for return, e.g., a probability of a certain word appearing in succession in relation to a set of N preceding words. Manager system 110 can record as semantic tag index data, e.g., missing word probabilities of similar strings. Manager system 110 can store the recorded index metadata in index format.

For generating (c) column association index metadata, manager system 110 can, for each incoming dataset, store index metadata specifying column (field) associations between columns of a dataset with their respective strength. For every column of a table based dataset, manager system 110 can record a column association and a strength value for the column association. Embodiments herein recognize that columns of a dataset can include various types of column associations, e.g., string-string, int-int, string-int, etc. Manager system 110 can record the column association type as index metadata.

Manager system 110 for assigning a column association strength value between any first and second columns can process the prior stored datasets of a corpus of prior stored datasets to ascertain the frequency with which the first and second columns appear together in prior stored datasets having at least one of the columns (the other datasets frequency test). Manager system 110 can scale column association strength values in dependence on the ascertained frequency. Manager system 110 can also scale column association strength values between any first and second column of a dataset in dependence on a determined capacity to predict values of the first column based on the value of the second column. The capacity to predict can be ascertained by training a machine learning model using corresponding row values of the first and second columns, and testing the accuracy of the trained model using holdout data (trained predictive model test). Manager system 110 can also scale column association strength values between any first and second columns of an incoming dataset in dependence on a capacity to derive a value of one of the columns based on a value of the other of the columns. In one example, manager system 110 can identify common character strings between first and second columns for ascertaining a capacity to derive a value from one of a first or second column from another of the first or second column (character string test). One example of first and second columns in which one of the columns can be derived from the other is the set of columns: email address and name.

Manager system 110 for assigning a column association strength score between any first and second columns can apply the formula as set forth in Eq. 1.

$$SA = FA1\,W1 + FA2\,W2 + FA3\,W \qquad \text{(Eq. 1)}$$

Where SA is the determined column association strength score, FA1-FA3 are factors, and W1-W3 are weights associated to the various factors. In one example, manager system 110 can scale assigned values under FA1 in dependence on a result of the described other datasets frequency test, can scale assigned values under FA2 in dependence on a result of the described predictive model test, and can scale assigned values under FA3 in dependence on a result of the described character string test.

Table B sets forth examples of dataset column associations featuring high threshold satisfying strength.

TABLE B

- {Zipcode, Country} has string-string association - For Country US, valid Zipcodes are {56001, 67132, .. etc}
- {Age, Salary} has int-int association - For age range [20-40], salary lies in range [200k, 500k]
- {Education, Salary} has string-int association - For education primary, salary range is [100k, 300k]
- {Name, email} has string-string association, where email values are derived using name name = John Walker
email = john.walker@abcmail.com Processing at block 1103 to generate index metadata can be regarded to be off-line processing, wherein one time operations for every newly added dataset can be performed to produce metadata including filename, dataset name and description including index metadata. Results from the off-line processing can be stored in a persistent storage to make it one time operational and can be consumed directly in an online phase. The described processing can increase processing speed and improve efficiency.

Manager system 110 performing metadata augmenting at block 1103 can include manager system 110 (a) producing column and datatype index metadata; (b) providing semantic tag metadata; and (c) producing field association index metadata.

At block 1104, manager system 110 can send user interface prompting data (prompting data) for display on a display of administrator user who is using an instance of UE devices 130A-130Z. The prompting data, in one example, can provide a view into datasets of a customer such as a customer associated to an enterprise of enterprise systems 150A-150Z.

Figure 3A:
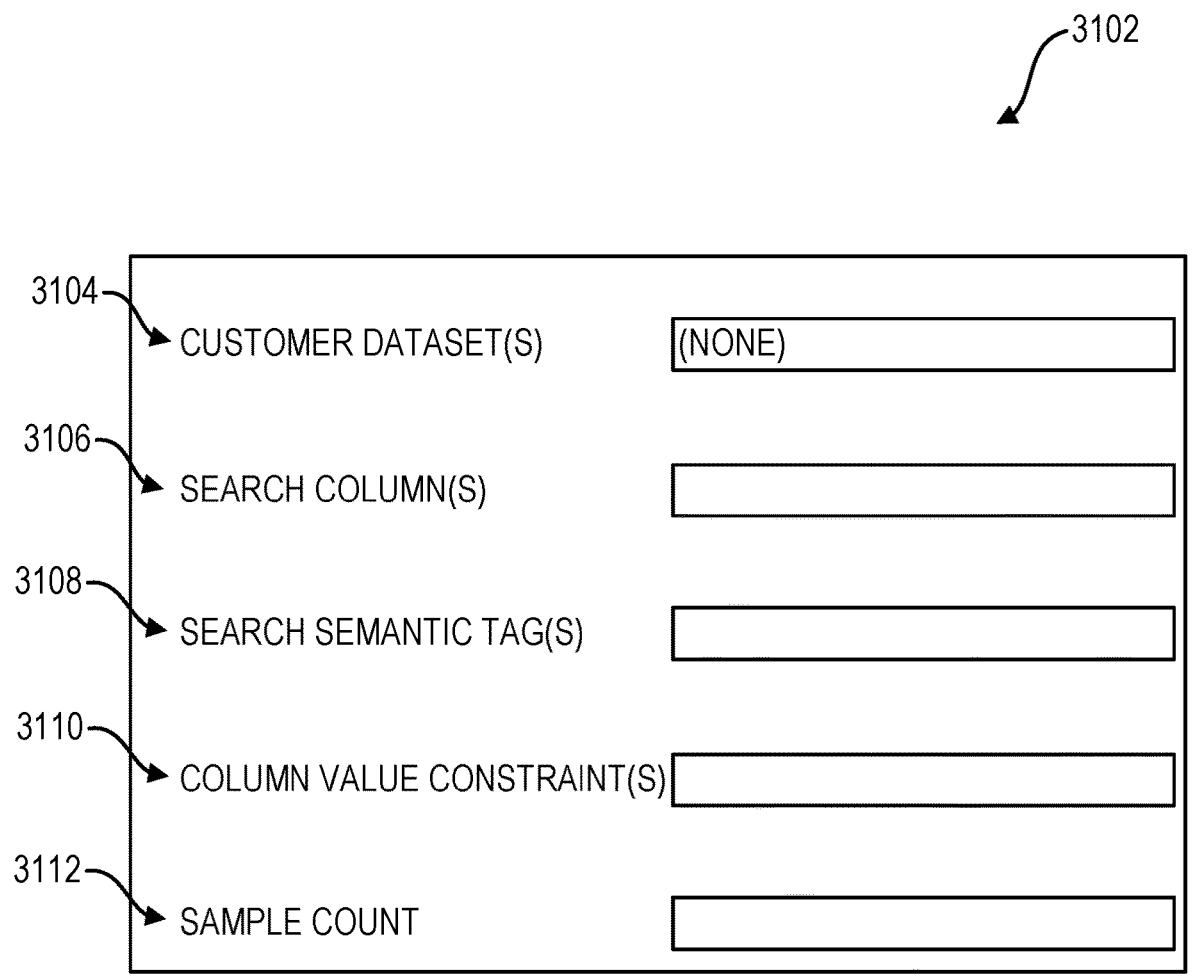

In one example, an administrator user can be using manager system 110 to produce a production dataset having attributes extending and emulating attributes of a customer dataset. Embodiments herein can include, in one example, expanding a customer dataset to include additional data emulating the customers data. In response to the prompting data sent at block 1103, an administrator using the described instance of UE devices 130A-130Z can define selection data that specifies selection of a particular one or more dataset of a customer enterprise to be emulated by processes herein. In response to the received selection data, manager system 110 at send block 1105 can send selection data for receipt by an enterprise system of enterprise systems 150A-150Z associated to a current customer. The selection data can specify selection of one or more customer dataset for emulating and extending. The selection data can alternatively specify that no customer dataset is selected. On receipt of the selection data sent at block 1105, the certain enterprise system of enterprise systems 150A-150Z associated to the current customer can send a dataset to be extended and emulated by manager system 110. Referring to user interface 3102 as shown in FIG. 3A prompting data 3104 can prompt for the selection of one or more customer dataset for emulating and expanding. The selection field can default to "none" if no input data is entered by an administrator user. User interface 3102 can be displayed on a display of UE device of UE devices 130A-130Z that is associated to an administrator user.

In response to the receipt of the dataset data sent at block 1501, manager system 110 at generating block 1106 can generate additional prompting data. The prompting data generated at block 1106 can include prompting data that invites the administrator user described with reference to block 1301 to define input data for the current emulation and extension initiative. At block 1107, manager system 110 can send the prompting data generated at block 1106 for presentment on a user interface such as user interface 3102 as shown in FIGS. 3A and 3B.

The prompting data generated at block 1106 can include prompting data that prompts the user to specify input data defining parameter values for a search for datasets that can be merged for providing of a production dataset for use in a customer's project. e.g., an API for testing, a machine learning predictive model supported process. The prompting data sent at block 1107 can include prompting data that prompts the user to specify, e.g., search columns, search semantic tags, column value constraints, and/or a sample count. Prompting data presented on user interface 3102 can include, e.g., search column prompting data 3106 for prompting entry of search column(s), search semantic tag prompting data 3108 for prompting entry of search semantic tag(s), column value constraint prompting data 3110 for prompting entry of one or more column value constraint, and/or sample count prompting data 3112 for prompting entry of a sample count. Where an administrator user in response to prompting data 3104 has entered one or more dataset for emulation and extension, manager system 110 can process the one or more entered dataset for emulation and extension, and can prepopulate the open data input fields of user interface with suggested values, which suggested values can be over-written at the election of the administrator user, or which can be accepted and selected by the administrator user in whole or in part.

In response to the receipt of the prompting data sent at block 1107, the UE device of the administrator user at send block 1302 can send selection data defined by the administrator user. The selection data can specify search parameter values for a search for datasets that are suitable for being merged in support of preparing a production dataset.

In one example, at block 1302 an administrator user may wish to produce a production dataset of 100 for Age, Salary, Country and Zipcode during Covid times for middle aged persons of Indian nationality. Accordingly, administrator user defined inputs can be provided as follows. In one example, there can be defined as search input data query data to fetch relevant data of size 100 for Age, Salary, Country and Zipcode during Covid times for mid-aged Indian citizens. Inputs defined by an administrator user can include search columns (entered adjacent to prompting data 3106):

[(Age, int), (Salary, int), (Country, string), (Zipcode, string)] (column names with their datatypes to be searched): search semantic tags (entered adjacent to prompting data 3108): [Covid, India] (e.g., topical keywords specifying the domain or theme of the target data—can be related to metadata or some column value: column value search constraints (entered adjacent to prompting data 3110): [Country: India, 30<age<60] (conditions on column values for the target data): sample count (entered adjacent to prompting data 3112): 100 (number of samples to be generated). The output can be provided by realistic samples.

Responsively to the receipt of the selection data sent at block 1302, manager system can perform examining augmented datasets of the metadata augmented datasets in dependence on metadata of the index metadata and in dependence on user defined input data. The examining can include examining for performance of, e.g., filtering and/or ranking as set forth herein.

In response to the receipt of the selection data sent at block 1302, manager system 110 can proceed to filtering block 1108. At filtering block 1108, manager system 110 can filter out and disqualify unqualified augmented datasets from augmented datasets area 2122 defining a corpus of datasets leaving qualified augmented datasets as candidate datasets for merging. At filtering block 1108, manager system 110 can examine metadata of index metadata of the various corpus dataset and data of input data entered by an administrator user into user interface 3102. At filtering block 1108, manager system 110 can perform one or more of column matching, semantic tag matching and/or column value constraint matching. On failure to match, manager system 110 can disqualify an augmented dataset from a set of candidate augmented datasets that are candidates for merging.

At filtering block 1108, manager system 110 for performance of column matching can perform analyzing search columns entered responsively to prompting data 3106, e.g., [(Age, int), (Salary, int), (Country, string), (Zipcode, string)] (column names with their datatypes to be searched) as set forth hereinabove with column and type index metadata of a corpus of augmented datasets of augmented datasets area 2122 defining a corpus. Based on the column matching by analyzing, manager system 110 can filter out and disqualify augmented datasets of the corpus that include no columns matching the specified columns of the input search data entered into user interface 3102.

At filtering block 1108, manager system 110 can for performance of semantic tag matching perform analyzing search semantic tags entered responsively to prompting data 3106, e.g., "Covid, India" as set forth hereinabove with semantic tag index metadata of a corpus of augmented datasets of augmented datasets area 2122 defining a corpus. Based on the determination by the semantic tag matching that a corpus dataset is absent any semantic tag entered as search input data by an administrator user using user interface 3102, manager system 110 can filter out and disqualify the dataset as a candidate augmented dataset for merging.

For performing filtering at block 1108, manager system 110 can analyze column value constraint(s) entered in response to prompting data 3110 and can perform field pruning based on the entered column value constraint(s). For example, where a column value constraint specifies "[Country: India, 30<age<60]" and a dataset of a corpus does not include any Country column values equaling "India" and does not include any Age column values of between 30 and 60, manager system 110 can filter out and exclude the dataset from qualified set of candidate datasets suitable for merging.

Manager system 110 for performance of column matching, in one embodiment, can qualify a dataset as having a matched column with a search input column name without there being an identical match between a search input data column name and datatype and a column corpus augmented dataset. For performing such semantic similarity based column matching, manager system 110 in one example can analyze a cluster classifier for the search input column name with a cluster classifier for a column name of a corpus augmented dataset as specified in the semantic tag data index metadata of the corpus augmented dataset. On the determination that there is commonality of cluster classification, manager system 110 can qualify the corpus augmented dataset as a candidate dataset for merging.

For performing semantic similarity based column matching, manager system 110 in one example can additionally or alternatively analyze a word2vec vector of the search input column name with a word2vec vector for a column name of a corpus augmented dataset as specified in the semantic tag data index metadata of the corpus augmented dataset. On the determination that word2vec vectors satisfy a maximum distance threshold, manager system 110 can qualify the corpus augmented dataset as a candidate dataset for merging.

For performing semantic similarity based column matching, manager system 110 in one example can additionally or alternatively query N-gram predictive model 4202 for determining whether compared column names satisfy a similarity threshold. Table C depicts pseudocode for performance of semantic similarity column matching.

TABLE C

```
def semantic_similarity(field1, field2):
    for every n1_gram in field1 where n1 varies from len(field1) to 1:        #Line A
    for every n2_gram in field2 where n2 varies from len(field2) to 1:        #Line B
        match_score = double_metaphone_compare(n1_gram, n2_gram) #handles spelling
mistakes and varied representations
    If match_score > T1:
    success = True              #Line C
    If not has_abbreviation(field1) and not has_abbreviation(field2):
    sim_score = semantic_sim_score(n1_gram, n2_gram)      #use generic thesaurus like wordnet
    if sim_score > T2:
        success = True              #Line D
    else:
    sim_score = either expand abbreviations or compute similarity with abbreviations #use a pre-
trained entity resolution solution
    if sim_score > T3:
        success = True              #Line E
    If success:
    score = fn(sim_score, n1/len(val1), n2/len(val2))          #Line F
    return score)
    return −1
```

Referring to [Line A, Line B] for input two column (field) names field1 and field2, manager system 110 can attempt to match N-grams of constituent terms starting from its maximum possible length to its minimum possible length of 1. For example, for a column 'Country zip code', the possible N-grams that can be checked in order for similarity match include: length 3—Country zip code, length 2—Country zip, zip code, length 1—Country, zip, code. Referring to [Line C, D, E], the search stops and no further shorter N-grams are checked for similarity once a match is found. The method ensures maximum possible similarity of constituent words in administrator user input fields. Referring to [Line F], semantic similarity score can be calculated as a function of similarity score and length % of matched N-grams. The method ensures that larger N-grams with the same similarity score can be assigned higher priority.

Manager system 110 can perform a variety of processes in the case that manager system 110 matches columns having column names that are not identical. During column matching, manager system 110 can perform column name disambiguation. In one example, manager system 110 can address use of abbreviations in column names in different datasets, wherein examples can include, e.g.: [Identifier, ID], [Address, Add., Addr.], [Number, No.], [First Name, Fname], [SSN, Social Security Number]. For performing abbreviation disambiguation, manager system 110 can apply, e.g., a pre-trained entity resolution solution or a fixed dictionary-based approach. Manager system 110 can also perform spelling error disambiguation, wherein there are spelling errors and varied representation of column names in different datasets. Examples of spelling errors include [Address, Addres], [First Name, first-name, First_name]. For performing spelling error disambiguation, manager system 110 can use double-metaphone processing, for example. For characterizing semantic similarity of column names existing in different datasets, e.g., [Project, Project ID], [Mobile No., Phone No.], [Gender, Sex], manager system 110 can employ natural language processing semantic characterizing processing as set forth herein, e.g., word2vector processing, and N-gram processing.

Manager system 110 for performance of semantic tag matching, in one embodiment, can qualify a dataset as having a matched semantic tag with a search input semantic tag without there being an identical match between a search input semantic tag and a semantic tag of corpus augmented dataset. For performing such semantic similarity based semantic tag matching, manager system 110 in one example can analyze a cluster classifier for the search input semantic tag with a cluster classifier for a semantic tag of a corpus augmented dataset as specified in the semantic tag data index metadata of the corpus augmented dataset. On the determination that there is commonality of cluster classification, manager system 110 can qualify the corpus augmented dataset as a candidate dataset for merging. For performing semantic similarity based semantic tag matching, manager system 110 in one example can additionally or alternatively analyze a word2vec vector of the search input semantic tag with a word2vec vector for a semantic tag of a corpus augmented dataset as specified in the semantic tag index metadata of the corpus augmented dataset. On the determination that word2vec vectors satisfy a maximum distance threshold, manager system 110 can qualify the corpus augmented dataset as a candidate dataset for merging. For performing semantic similarity based semantic tag matching, manager system 110 in one example can additionally or alternatively query N-gram predictive model 4202 for determining whether compared column names satisfy a similarity threshold. Accordingly, there is set forth herein, a method comprising processing a plurality of raw datasets for generating index metadata and associating one or more index defining the index metadata to respective ones of the plurality raw datasets, wherein the respective ones of the plurality of raw datasets define respective metadata augmented datasets by the associating of the one or more index thereto: examining augmented datasets of the metadata augmented datasets in dependence on metadata of the index metadata and in dependence on user defined input data; and merging first and second ones of the augmented datasets in dependence on the examining augmented datasets, wherein the merging first and second ones of the augmented datasets in dependence on the examining augmented datasets is performed in support of preparing a production dataset, wherein the associating one or more index defining the index metadata to respective ones of the plurality raw datasets includes associating to a first raw dataset of the plurality of datasets, a column name and datatype index that specifies column names and datatypes of columns of the first raw dataset, wherein the associating to the first raw dataset the column name and datatype index defines the first augmented dataset, wherein the method includes comparing a user input search column name to a column name of the column name and datatype index and qualifying the first augmented dataset for merging in dependence on the comparing, wherein the user input search column name is non-identical to the column name of the column name and datatype index, and wherein the qualifying includes assessing a word2vec clustering analysis Euclidian distance between the user input search column name and the column name of the column name and datatype index.

On completion of filtering at block 1108, manager system 110 can proceed to ranking block 1109. At ranking block 1109, manager system 110 can identify groups of datasets capable of satisfying search criterion defined by the search inputs input to user interface 3102, and can rank the identified groups.

Figure 5:
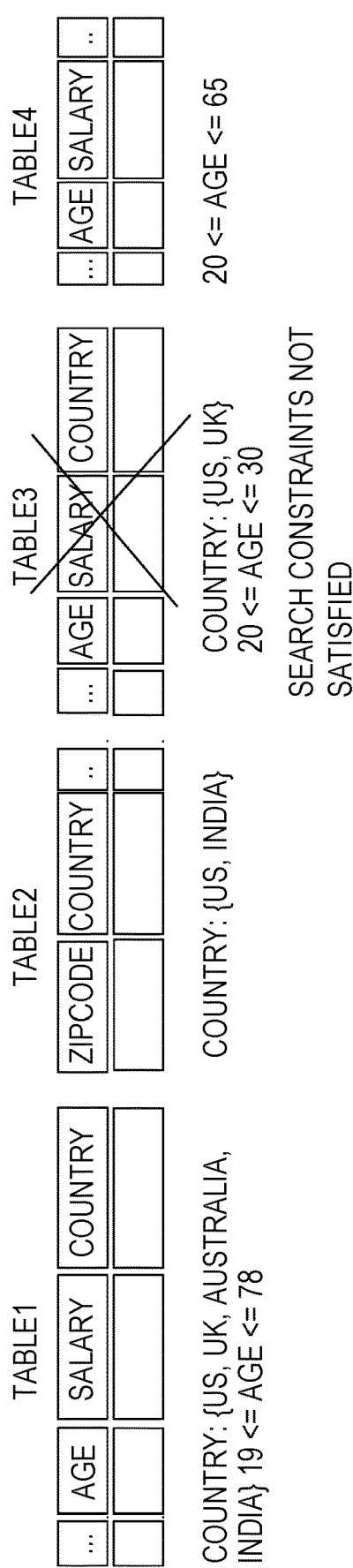
FIG. 5 depicts a process for ranking candidate dataset groups for use in producing a production dataset according to one embodiment.

Manager system 110 performing identifying and ranking at block 1109 is described further in reference to FIG. 5. In reference to FIG. 5, administrator user defined search input data can specify the input search columns: [(Age, int), (Salary, int), (Country, string), (Zipcode, string)], as well as input column value constraints: [Country: India, 30<age<60)].

The corpus of datasets available in augmented datasets area 2122 can include Table1-Table4 as shown in FIG. 5 in the described scenario. Manager system 110 performing filtering at block 1108 can include manager system 110 filtering out and disqualifying Table3 based on Table3 having column values outside the column value constraint. Manager system 110 referring to FIG. 5 can identify all valid groups of datasets that when combined are capable of satisfying the search criteria. Manager system 110 can determine that a group is a valid and qualified group based on the collection of column names of the group of datasets satisfying the search criteria. Manager system 110 can identify the group of datasets Table1 and Table2 as a dataset group capable of satisfying the search criteria based on the datasets of the group, when combined, satisfying the input search columns: [(Age, int), (Salary, int), (Country, string), (Zipcode, string)]. Manager system 110 can identify the group of datasets Table3+Table 4 as a dataset group capable of satisfying the search criteria based on the datasets of the group when combined satisfying the input search columns: [(Age, int), (Salary, int), (Country, string), (Zipcode, string)].

Manager system 110 for ranking the identified candidate groups of datasets can apply the group scoring formula as set forth in Eq. 2 for scoring each candidate dataset group.

$$SR = FR1 \cdot W1 + FR2 \cdot W2 + FR3 \cdot W3 \tag{Eq. 2}$$

Where SR is the group ranking scoring for the group of datasets being scored, FR1-FR4 are factors, and W1-W4 are weights associated to the various factors. In one embodiment, FR1 can be a common column factor, FR2 can be a column association strength scoring factor, and FR3 can be a semantic distance factor.

Regarding factor FR1, manager system 110 for each candidate group of datasets can identify common columns between datasets defining the group, and can scale scoring values under factor FR1 in dependence on a count of common columns between the datasets. According to factor F1, manager system 110 can score the group of datasets Table1+Table2 higher than the group of datasets Table2+Table4 under factor FR4 based on the group of datasets Table1+Table2 having one column (Country) common between datasets of the group, whereas the group of datasets Table2+Table4 have zero columns in common between datasets of the groups. Embodiments herein recognize that biasing rankings of groups in favor of groups featuring addition common columns between datasets preserves additional association between columns, resulting in the production database that is more realistic. In the example described, it will be seen that selecting the group of datasets Table1+Table2 preserves additional association, and accordingly, will assure that age and salary are selected from the same Country as the Zipcode. By contrast, if the group of datasets Table2+Table4 is selected, association between Salary. Age. Zipcode will not occur in the return values.

Regarding factor FR2, manager system 110 can scale scoring values under factor FR2 in dependence on index metadata column association strength values described in connection with Eq. 1. Referring to the situation where the corpus further includes Table5, a dataset having the same columns as Table1. Where manager system 110 has recorded column association strength index metadata using Eq. 1 so that column association between salary and age columns is stronger in dataset Table5 than in Table1, manager system 110 can scale scoring values assigned under factor FR2 higher for the group Table5+Table1 than for the group Table1+Table2 (in one example, the group Table1+Table2 can include anomalous unrealistic data that exhibits no trends between column values of different columns).

Regarding factor FR3, manager system 110 can scale scoring values under factor FR2 in dependence on semantic distance in a matched column. Referring to the situation where the corpus includes the additional dataset Table6, which is similar to Table2, except that it includes the column names Zipcode. Jurisdiction rather than Zipcode. Country. Manager system 110 in the described example may have matched the column Jurisdiction to Country using semantic similarity analysis Manager system 110 can assign scoring values under factor FR3 to 1.0 (maximum) where compared column names are identical, and can assign scoring values under factor FR3 in dependence on word2vec clustering Euclidian distance between Country and Jurisdiction, e.g., reading index data or querying word2vec clustering predictive model 4102 when assigning scoring values for a dataset group in which the column names Country and Jurisdiction are identified as matched columns. In the described situation, manager system 110 can nevertheless conceivably score the group Table1+Table6 higher than the group Table1+Table2 if the column association strength scoring between Zipcode and Jurisdiction (factor FR2) in Table1+Table6 exceeds the column association strength scoring between Zipcode and Country (factor FR2) in Table1+Table2 such that the overall score of Table1+Table6 under Eq. 2 is driven higher than the overall scoring value for the group Table1+Table2. Thus, it is seen that expanding column matching conditions using semantic similarity processing can expand access to additional column associations (the strongly associated Zipcode and Jurisdiction columns in Table6, defining realistic data.

Ranking at ranking block 1109 can score versions of each candidate grouping using Eq. 2, wherein the versions of the different groups can be differentiated in terms of what columns are selected for merging from each dataset. In the described scenario where the group Table1Table2 is scored, version 1 can include extracting {Age, Salary, Country} from Table1 for merging and {Zipcode} from Table2, and version 2 can include extracting {Age, Salary} from Table1 and {Zipcode, Country} from Table2, Applying Eq. 2, manager system 110 can assign higher scoring values under factor FR2 to version 1 than version 2, due to version 2 preserving the strong Zipcode, Country column association from Table2. By contrast, version 1 which would have been selected under an alternate algorithm that selects a maximum count of columns from each dataset produces unrealistic data, wherein Zipcode is not realistically related to Country. Knowledge about semantic correlation existing between Zipcode and Country is lost in the output if version 1 is selected.

On completion of ranking block 1109, manager system 110 can proceed to block 1110. At block 1110, manager system 110 can perform generating of prompting data for prompting a user to select groups of datasets for merging. At generating block 1110, manager system 110 can generate prompting data that specifies the respective rankings of different sets of datasets that can be merged.

In response to the completion of generating block 1110, manager system 110 can proceed to send block 1111. At send block 1111, manager system 110 can send prompting data for presentment on a user interface, such as displayed user interface 3102 as shown in FIG. 3A and FIG. 3B. As shown in FIG. 3B, prompting data can include prompting data 3122 that specifies a first dataset group (version 2) for merging, prompting data 3124 that specifies a second dataset group for merging, and prompting data 3126 that specifies the first dataset group for merging (second version). The prompting data 3122, 3124, 3126 can indicate relative ranks between the group options and overall scoring SR values as determined under Eq. 2. The versions of group A can be differentiated in terms of the columns of the different datasets that are selected for merging, as is explained further in reference to FIG. 5. The text based prompting data 3122, 3124, 3126 can comprise active text such that when actuated activates dataset merging of the selected datasets. That is, if prompting data 3122 is selected, manager system 110 can merge the datasets of group A. If prompting data 3122 is selected, manager system 110 can merge the datasets of group B. Any number of valid candidate groups can be indicated with presented prompting data. In one embodiment, the presentment of prompting data as set forth in FIG. 3B can be avoided, and manager system 110 can default to proceeding with merging of datasets of the highest ranked valid group (in the described instance, group A, version 2). The text based prompting data 3122, 3124, 3126 can comprise active text such that on particularized selection action, e.g. hover or right click, additional text based prompting data is presented, e.g., text based prompting data that specifies the columns of the various datasets that are selected for merging according to the option.

In response to the prompting data sent at block 1111, the administrator user at send block 1303 can send selection data specifying selection of prompted for datasets to be merged. The prompting data sent at block 1111 can present different datasets to be merged based on the ranking performed at block 1109. At send block 1303, the described administrator user can select the prompted for datasets to be merged.

Based on receipt of the described selection data sent at block 1303, manager system 110 can proceed to merge block 1112. At merge block 1112, manager system 110 can perform dynamic semantic merging of datasets selected according to the selection data sent at block 1303. On completion of merging at block 1112, manager system 110 at store block 1113 can perform storing of an output production dataset prepared in dependence on the merging.

Manager system 110, for performance of dynamic semantic merging, can perform entity resolution among the constituent values of matched columns that can be ranked for joining data from multiple datasets for search columns, merging data constraints from these multiple (ranked) columns, and thereby generate realistic sample data in which column associations can be preserved in dependence on determined column association strength, which can be expressed as index metadata. For the similar (or same) column names, such as gender and sex in different table based dataset, their respective values can be mapped. Mapping can include mapping as set forth in Table D.

TABLE D

Subset mapping - values in gender: [Male, Female] and sex: [Male, Female, Others]
- Here, the mapping is Male <-> Male, Female <-> Female, undefined <-> Others Equality mapping - values in both fields as exactly the same i.e. [Male, Female]
- Here, the mapping is Male <-> Male, Female <-> Female Abbreviation mapping - values in gender: [Male, Female] and sex: [M, F, O]
- Here, the mapping is Male <-> M, Female <-> F, undefined <-> O For performance of dynamic semantic merging, inputs can include the inputs as summarized in Table E.

TABLE E

Query: Fields - F, Constraints - Q, expected number of rows - n
Matching Tables: A set of tables and their relevant fields matching with the query fields. Each table has the set of matching rows satisfying Q.

The output can include: n rows matching rows of the query.

An objective of the algorithm can be to compute a value based join between multiple tables. The dynamic semantic merging algorithm herein can generalize the traditional join of structured query language (SQL) by performance of (i) Semantic value matching, e.g., wherein the column Gender value Male can be semantically matched with the column Sex column value M. The dynamic semantic merging algorithm herein can generalize the traditional join of SQL further by performance of (ii) association-based constraint matching: Tab1(A,B) and Tab2 (B, C) and B is a numeric. For example, Tab2 has association constraints, C=B*200+ 3400. For each row (a,b) in Tab1. If b is not in Tab2-B, then determine C's value using the above equation.

Dynamic semantic merging can include (1) semantic-based Join: Manager system 110 can perform the join between datasets for which there are common fields using the two techniques (i) and (ii) described above. Dynamic semantic merging can include (2) merging the joined table with the individual tables by selecting maximum n rows from each of them to create n row with all query search fields input by an administrator user. Manager system 110 can remove rows having values outside an input column value range when performing dynamic semantic merging.

For the similar (or same) column names, such as gender and sex in different tables, their respective values can be mapped. Mapping can include Equality mapping-values in both fields as exactly the same i.e. [Male, Female]. Here, the mapping is Male<->Male, Female<->Female. Mapping can also include Abbreviation mapping-values in gender: [Male, Female] and sex: [M, F, O]. Here, the mapping is Male<->M. Female<->F, undefined<->0.

Manager system 110 can produce the production dataset defined by the administrator user selection and on completion of production of the production dataset, manager system 110 can proceed to store block 1113.

At store block 1113, manager system 110 can store the provided production dataset in production dataset area 2123 of data repository 108. On completion of store block 1113, manager system 110 can proceed to testing block 1114. At testing block 1114, manager system 110 can perform testing of the API using the production dataset. At block 1115 manager system 110 can ascertain whether the API satisfied the performance test using selected KPIs, e.g., call latency performance, error rate performance, consistency of service performance. If the testing failed, manager system 110 can return to a stage preceding block 1104 or optionally block 1111. If testing is successful, manager system 110 can proceed to send block and then to training block 1117. At send block 1116 manager system 110 can send a signal to enterprise system of enterprise systems 150A-150Z to activate the successfully tested API.

Manager system 110 at training block 1116 can perform machine learning training using data of the provided production dataset produced at block 1112 and on completion of the training at block 1117, manager system 110 can perform testing at block 1118. At block 1118 manager system 110 can perform testing of the machine learning model just trained. The testing at block 1118 can include testing using holdout data. On completion of testing at block 1118 manager system 110 can proceed to block 1119. At block 1119 manager system 110 can ascertain whether the machine learning trained model satisfied the performance test using selected KPIs, e.g., the accuracy of the prediction as measured by the holdout data. If the testing failed, manager system 110 can return to a stage preceding block 1104 or optionally block 1111. If testing passes, manager system 110 can proceed to predicting block 1120.

Predicting at block 1120 can include querying the described trained predictive model trained at training block 1117. The query data can include received data from an enterprise system of enterprise systems 150A-150Z. On completion of predicting block 1120, manager system 110 can proceed to block 1121.

At block 1121, manager system 110 can send an output prediction to a customer associated to a select certain enterprise of enterprise systems 150A-150Z and the output prediction can be used to control the customer process. At action control block 1503, a customer process can be controlled based on the prediction data sent at block 1121. The customer process can include, e.g., a process for operating an industrial machine, operating a user interface, migrating virtual machines, and the like. On completion of block 1121, manager system 110 can proceed to block 1122.

Accordingly, there is set forth herein, a method comprising processing a plurality of raw datasets for generating index metadata and associating one or more index defining the index metadata to respective ones of the plurality raw datasets, wherein the respective ones of the plurality of raw datasets define respective metadata augmented datasets by the associating of the one or more index thereto; examining augmented datasets of the metadata augmented datasets in dependence on metadata of the index metadata and in dependence on user defined input data; and merging first and second ones of the augmented datasets in dependence on the examining augmented datasets, wherein the merging first and second ones of the augmented datasets in dependence on the examining augmented datasets is performed in support of preparing a production dataset, wherein the method includes one or more of the following selected from the groups consisting of (a) applying data of the production dataset for testing of an application program interface (API), and deploying the API for receipt of production traffic based on satisfactory performance of the API resulting from the testing, and (b) applying data of the production dataset for testing an application program interface, presenting subsequent prompting data to the user based on the examining in dependence on a result of the testing and merging alternate ones of the augmented datasets based on selection data of the user received in response the presenting subsequent prompting data.

While FIG. 2 depicts applying production dataset data to both an API and a machine learning model interface, manager system 110 can send production dataset data to greater than or less the described number of interfaces.

At block 1122, manager system 110 can return to a stage preceding send block 1101 and can iterate blocks 1101-1122. Manager system 110 can be iteratively performing the loop of blocks 1101-1122 during a deployment period of manager system. Further, manager system 110 can be iteratively performing the loop of blocks 1101-1122 simultaneously and contemporaneously for various different applications performed on behalf of different customer users associated to different ones of enterprise systems. Data library systems 140A-140Z can be iteratively, on completion of send block 1401, can proceed to return block 1402 and can be iteratively performing the loop of blocks 1401-1402 during a deployment period of data systems 140A-140C. Enterprise systems 150A-150Z, on completion of send block 1501 can proceed to block 1502 and on completion of block 1502 can proceed to return block 1503. At return block 1504, enterprise systems 150A-150Z can return to a stage prior to send block 1501 and enterprise systems 150A-150Z can iteratively be performing the loop of blocks 1501 to 1504 during a deployment period of enterprise systems 150A-150Z. UE devices 130A-130Z, on completion of send block 1503 can proceed to return block 1304. At return block 1304, UE devices 130A-130Z can return to a stage proceeding block 1301 to receive prompting data sent at block 1104. UE devices 130A-130Z can be iteratively performing the loop of blocks 1301 to 1304 during a deployment period of UE devices 130A-130Z.

Figure 6:
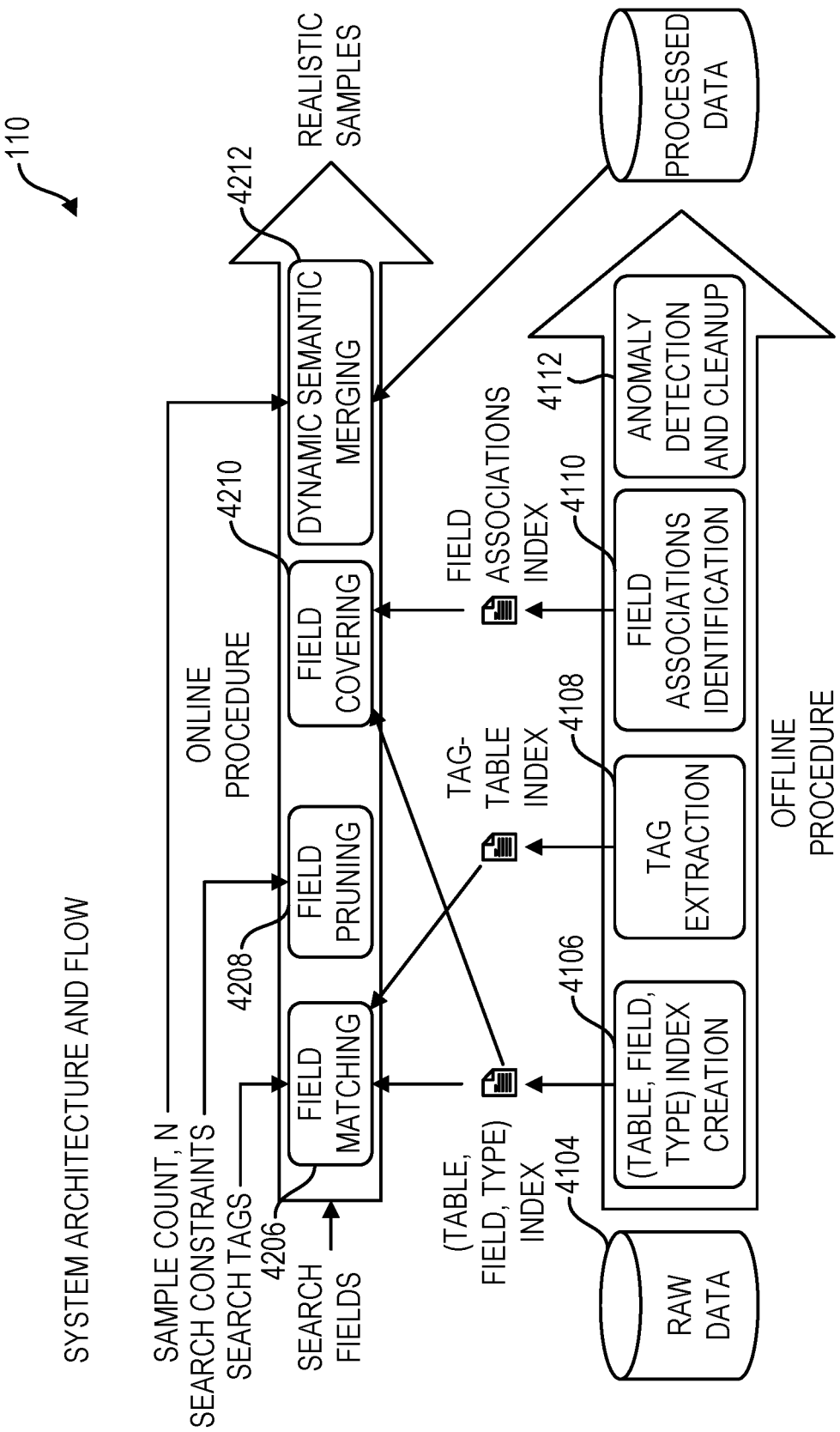
FIG. 6 depicts a system architecture and flow for manager system for performance of methods herein according to one embodiment.

Referring to FIG. 6, there is depicted a system architecture and flow according to functions of manager system 110. Manager system 110 can perform various offline processes including column and datatype index creation at block 4106, semantic tag index creation at block 4108, column association index creation at block 4110 and anomaly detection and cleanup at block 4112. Manager system 110 can run various online processes including column matching at block 4206, field pruning at block 4208, field covering at block 4210, e.g., by identification of merges that preserve maximum column association, and dynamic semantic merging at block 4212.

Embodiments herein as set forth in reference to the prophetic examples herein recognize that generating realistic test cases is an important problem for automating creation of test suite. Embodiments herein recognize that generating realistic test data can include generating realistic column values for columns. Embodiments herein recognize that without realistic test data an API testing process may not subject the API to data patterns observed when an API is placed online. Embodiments herein recognize that when synthetic datasets that are absent realistic data are used to train a predictive model, the trained model will not reveal trends that are absent from the synthetic training data. Embodiments herein set forth to produce realistic datasets. In one aspect, embodiments herein when merging datasets can rank candidate groups of datasets for merging in dependence on column association strength scores, and can perform merging in a manner to preserve strongest column associations, thus producing realistic data in which meaningful strongest associations between column values are preserved and not truncated by a merging. In another aspect, merging between datasets can include semantic similarity matching which can expand a count of qualified candidate dataset groups, thus producing additional opportunities for preservation of realistic data defined by the most strongly associated columns.

Certain embodiments herein may offer various technical computing advantages involving computing advantages to address problems arising in the realm of computer systems and computer networks, including improvements in computer technology in the realm of production datasets which can feature, e.g., improved consistency, relevance reliability with reduced errors. In generating production datasets, embodiments herein can attach and associate index metadata to raw datasets which index metadata can include column and datatype index metadata, semantic tag metadata, and column association metadata. The use of the described index metadata can increase processing speed and reduce consumption of computing resources in the development of production datasets for use in a variety of downstream processes including machine learning processes. On receipt of administrator user input data specifying parameter values for a production dataset, embodiments herein can examine the specified input data with the previously produced index metadata to identify candidate augmented datasets for use in providing the production dataset, and can further identify candidate dataset groups for merging. In performing the identifying of candidate dataset groups, embodiments herein can rank the candidate dataset groups in dependence on which groups will preserve realistic data defined by associated column data exhibiting strongest column association trends. In one aspect, embodiments herein when merging datasets can rank candidate groups of datasets for merging in dependence on column association strength scores, and can perform merging in a manner to preserve strongest column associations, thus producing realistic data in which meaningful strongest associations between column values are preserved and not truncated by a merging. In another aspect, merging between datasets can include semantic similarity matching which can expand a count of qualified candidate dataset groups, thus producing additional opportunities for preservation of realistic data defined by the most strongly associated columns. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription.

Figure 7:
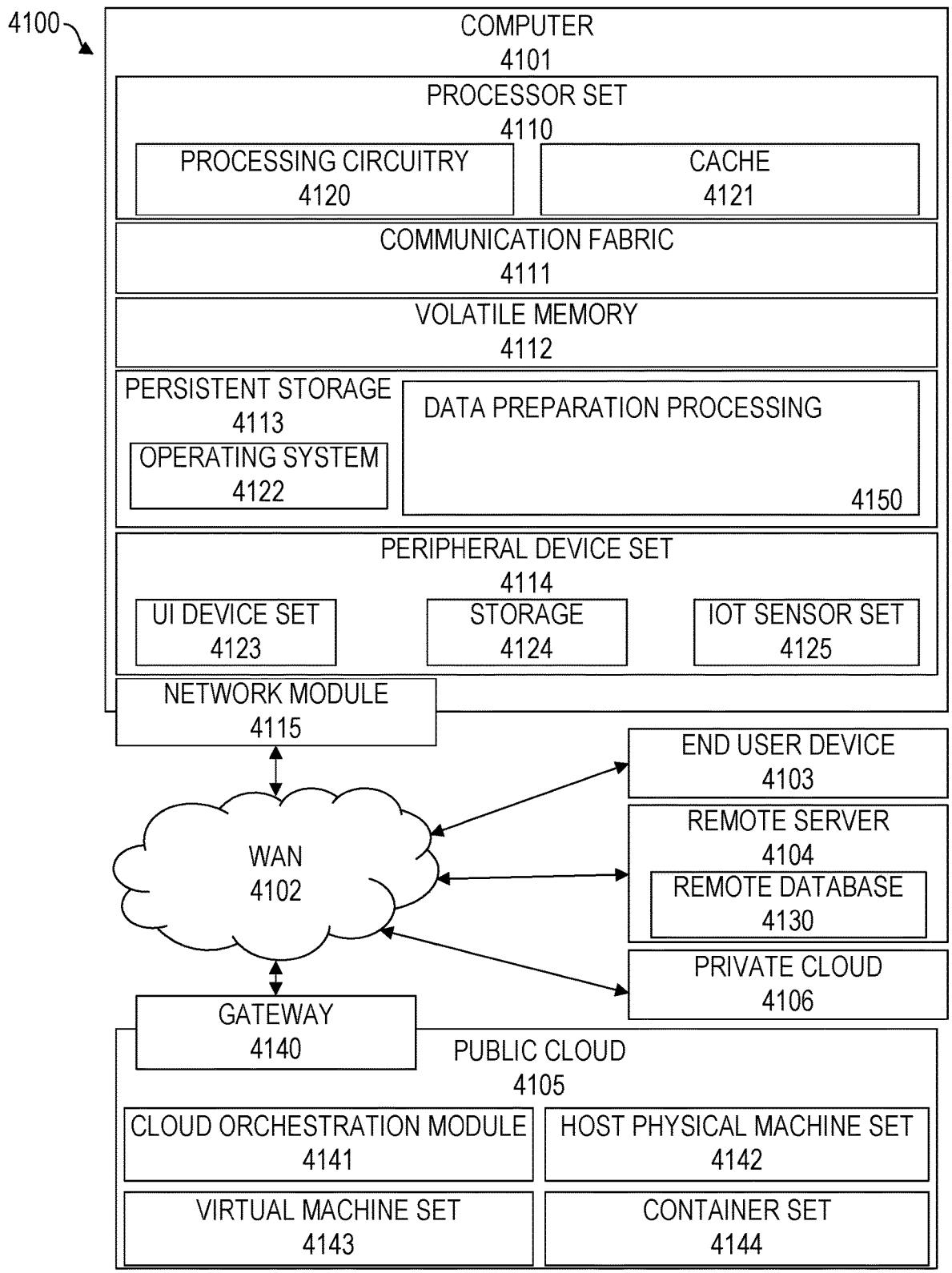
FIG. 7 depicts a computing environment according to one embodiment.

In reference to FIG. 7 there is set forth a description of a computing environment 4100 that can include one or more computer 4101. In one example, a computing node as set forth herein can be provided in accordance with computer 4101 as set forth in FIG. 7.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present invention is described with reference to FIG. 7 In one aspect, a computing environment 4100 contains an example of an environment for the execution of at least some of the computer code involved in performing the inventive methods, such as code 4150 for performing dataset preparation processing as set forth in reference to FIGS. 1-5. In addition to block 4150, computing environment 4100 includes, for example, computer 4101, wide area network (WAN) 4102, end user device (EUD) 4103, remote server 4104, public cloud 4105, and private cloud 4106. In this embodiment, computer 4101 includes processor set 4110 (including processing circuitry 4120 and cache 4121), communication fabric 4111, volatile memory 4112, persistent storage 4113 (including operating system 4122 and block 4150, as identified above), peripheral device set 4114 (including user interface (UI) device set 4123, storage 4124, and Internet of Things (IoT) sensor set 4125), and network module 4115. Remote server 4104 includes remote database 4130. Public cloud 4105 includes gateway 4140, cloud orchestration module 4141, host physical machine set 4142, virtual machine set 4143, and container set 4144. IoT sensor set 4125, in one example, can include a Global Positioning Sensor (GPS) device, one or more of a camera, a gyroscope, a temperature sensor, a motion sensor, a humidity sensor, a pulse sensor, a blood pressure (bp) sensor or an audio input device.

Computer 4101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 4130. As is well understood in the art of computer technology, and depending upon the technology, performance of a computer-implemented method may be distributed among multiple computers and/or between multiple locations. On the other hand, in this presentation of computing environment 4100, detailed discussion is focused on a single computer, specifically computer 4101, to keep the presentation as simple as possible. Computer 4101 may be located in a cloud, even though it is not shown in a cloud in FIG. 1. On the other hand, computer 4101 is not required to be in a cloud except to any extent as may be affirmatively indicated.

Processor set 4110 includes one, or more, computer processors of any type now known or to be developed in the future. Processing circuitry 4120 may be distributed over multiple packages, for example, multiple, coordinated integrated circuit chips. Processing circuitry 4120 may implement multiple processor threads and/or multiple processor cores. Cache 4121 is memory that is located in the processor chip package(s) and is typically used for data or code that should be available for rapid access by the threads or cores running on processor set 4110. Cache memories are typically organized into multiple levels depending upon relative proximity to the processing circuitry. Alternatively, some, or all, of the cache for the processor set may be located "off chip." In some computing environments, processor set 4110 may be designed for working with qubits and performing quantum computing.

Computer readable program instructions are typically loaded onto computer 4101 to cause a series of operational steps to be performed by processor set 4110 of computer 4101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 4121 and the other storage media discussed below. The program instructions, and associated data, are accessed by processor set 4110 to control and direct performance of the inventive methods. In computing environment 4100, at least some of the instructions for performing the inventive methods may be stored in block 4150 in persistent storage 4113.

Communication fabric 4111 is the signal conduction paths that allow the various components of computer 4101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 4112 is any type of volatile memory now known or to be developed in the future. Examples include dynamic type random access memory (RAM) or static type RAM. Typically, the volatile memory is characterized by random access, but this is not required unless affirmatively indicated. In computer 4101, the volatile memory 4112 is located in a single package and is internal to computer 4101, but, alternatively or additionally, the volatile memory may be distributed over multiple packages and/or located externally with respect to computer 4101.

Persistent storage 4113 is any form of non-volatile storage for computers that is now known or to be developed in the future. The non-volatility of this storage means that the stored data is maintained regardless of whether power is being supplied to computer 4101 and/or directly to persistent storage 4113. Persistent storage 4113 may be a read only memory (ROM), but typically at least a portion of the persistent storage allows writing of data, deletion of data and re-writing of data. Some familiar forms of persistent storage include magnetic disks and solid state storage devices. Operating system 4122 may take several forms, such as various known proprietary operating systems or open source. Portable Operating System Interface-type operating systems that employ a kernel. The code included in block 4150 typically includes at least some of the computer code involved in performing the inventive methods.

Peripheral device set 4114 includes the set of peripheral devices of computer 4101. Data communication connections between the peripheral devices and the other components of computer 4101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 4123 may include components such as a display screen, speaker, microphone, wearable devices (such as goggles and smart watches), keyboard, mouse, printer, touchpad, game controllers, and haptic devices. Storage 4124 is external storage, such as an external hard drive, or insertable storage, such as an SD card. Storage 4124 may be persistent and/or volatile. In some embodiments, storage 4124 may take the form of a quantum computing storage device for storing data in the form of qubits. In embodiments where computer 4101 is required to have a large amount of storage (for example, where computer 4101 locally stores and manages a large database) then this storage may be provided by peripheral storage devices designed for storing very large amounts of data, such as a storage area network (SAN) that is shared by multiple, geographically distributed computers. IoT sensor set 4125 is made up of sensors that can be used in Internet of Things applications. For example, one sensor may be a thermometer and another sensor may be a motion detector. A sensor of IoT sensor set 4125 can alternatively or in addition include, e.g., one or more of a camera, a gyroscope, a humidity sensor, a pulse sensor, a blood pressure (bp) sensor or an audio input device.

Network module 4115 is the collection of computer software, hardware, and firmware that allows computer 4101 to communicate with other computers through WAN 4102. Network module 4115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 4115 are performed on the same physical hardware device. In other embodiments (for example, embodiments that utilize software-defined networking (SDN)), the control functions and the forwarding functions of network module 4115 are performed on physically separate devices, such that the control functions manage several different network hardware devices. Computer readable program instructions for performing the inventive methods can typically be downloaded to computer 4101 from an external computer or external storage device through a network adapter card or network interface included in network module 4115.

WAN 4102 is any wide area network (for example, the internet) capable of communicating computer data over non-local distances by any technology for communicating computer data, now known or to be developed in the future. In some embodiments, the WAN 4102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 4103 is any computer system that is used and controlled by an end user (for example, a customer of an enterprise that operates computer 4101), and may take any of the forms discussed above in connection with computer 4101. EUD 4103 typically receives helpful and useful data from the operations of computer 4101. For example, in a hypothetical case where computer 4101 is designed to provide a recommendation to an end user, this recommendation would typically be communicated from network module 4115 of computer 4101 through WAN 4102 to EUD 4103. In this way, EUD 4103 can display, or otherwise present, the recommendation to an end user. In some embodiments, EUD 4103 may be a client device, such as thin client, heavy client, mainframe computer, desktop computer and so on.

Remote server 4104 is any computer system that serves at least some data and/or functionality to computer 4101. Remote server 4104 may be controlled and used by the same entity that operates computer 4101. Remote server 4104 represents the machine(s) that collect and store helpful and useful data for use by other computers, such as computer

4101. For example, in a hypothetical case where computer 4101 is designed and programmed to provide a recommendation based on historical data, then this historical data may be provided to computer 4101 from remote database 4130 of remote server 4104.

Public cloud 4105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 4105 is performed by the computer hardware and/or software of cloud orchestration module 4141. The computing resources provided by public cloud 4105 are typically implemented by virtual computing environments that run on various computers making up the computers of host physical machine set 4142, which is the universe of physical computers in and/or available to public cloud 4105. The virtual computing environments (VCEs) typically take the form of virtual machines from virtual machine set 4143 and/or containers from container set 4144. It is understood that these VCEs may be stored as images and may be transferred among and between the various physical machine hosts, either as images or after instantiation of the VCE. Cloud orchestration module 4141 manages the transfer and storage of images, deploys new instantiations of VCEs and manages active instantiations of VCE deployments. Gateway 4140 is the collection of computer software, hardware, and firmware that allows public cloud 4105 to communicate through WAN 4102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 4106 is similar to public cloud 4105, except that the computing resources are only available for use by a single enterprise. While private cloud 4106 is depicted as being in communication with WAN 4102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 4105 and private cloud 4106 are both part of a larger hybrid cloud.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer readable program instructions for carrying out operations of embodiments of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
processing a plurality of raw datasets for generating index metadata and associating one or more index defining the index metadata to respective ones of the plurality of raw datasets, wherein the respective ones of the plurality of raw datasets define respective metadata augmented datasets by the associating of the one or more index thereto, wherein the associating of the one or more index defining the index metadata to the respective ones of the plurality of raw datasets includes associating to the respective ones of the plurality of raw datasets a column association index that specifies a strength of column associations between columns of the respective ones of the plurality of raw datasets with respective strength values, wherein a strength value of a column association between a first column and a second column in a respective raw dataset is based on a frequency in which the first column and the second column appear together in a same dataset in a corpus of stored datasets having at least one of the first column or the second column;
examining augmented datasets of the metadata augmented datasets in dependence on metadata of the index metadata and in dependence on user defined input data specifying parameter values of a production dataset to be produced; and
merging first and second ones of the augmented datasets in selected groups of augmented datasets in dependence on the examining of the augmented datasets, wherein the merging of the first and second ones of the augmented datasets in dependence on the examining of the augmented datasets is performed in support of preparing the production dataset, and wherein the merging of the first and second ones of the augmented datasets is performed in dependence on an evaluation of the column association index of the first augmented dataset in reference to the column association index of the second augmented dataset.

2. The method of claim 1, wherein a strength value of a column association between a first column and a second column in a respective raw dataset is based on a determined capacity to predict values of the first column based on a value of the second column, and a capacity to derive a value of one of the first column and the second column based on a value of the other of the first column and the second column.

3. The method of claim 1, wherein the examining of the augmented datasets includes filtering out unqualified datasets and identifying qualified groups of augmented datasets that can be processed together for output of the production dataset.

4. The method of claim 1, wherein the method includes ranking qualified groups of augmented datasets, the ranking including scoring versions of each qualified group of augmented datasets based at least in part on column association strength values specified in the column association index of each respective dataset in the qualified group of augmented datasets, wherein the versions of the qualified group of augmented datasets are differentiated in terms of what columns are selected for merging from each dataset of the qualified group of augmented datasets.

5. The method of claim 1, wherein the merging of the first and second ones of the augmented datasets includes selecting a subset of columns from each of the first and second ones of the augmented datasets for merging according to a version of a selected group of augmented datasets in which the first and second ones of the augmented datasets belongs.

6. The computer implemented method of claim 1, wherein the associating of the column association index to the respective ones of the plurality of raw datasets includes storing the column association index in persistent memory for subsequent reuse in examining datasets of the metadata augmented datasets.

7. The computer implemented method of claim 1, wherein the column association index specifies strength values for a plurality of column pairs in each respective raw dataset, and wherein the examining of the augmented datasets includes selecting column pairs above a threshold strength value for inclusion in the merging.

8. The computer implemented method of claim 1, wherein the method includes receiving a user input identifying one or more target columns for inclusion in the production dataset, and wherein the merging of the augmented datasets is performed in dependence on identifying datasets in which the target columns exhibit a strength value above a defined threshold in the column association index.

9. The computer implemented method of claim 1, wherein the method includes generating alternative versions of merged datasets by varying which columns are selected from the first and second augmented datasets, and wherein each version is associated with a composite column association score based on strength values of the selected columns.

10. The computer implemented method of claim 1, wherein the strength value of the column association is further based on a correlation metric computed over a subset of historical datasets in which both the first and second columns co-occur.

11. The computer implemented method of claim 1, wherein the column association index includes a directional strength value representing a capacity to impute a value of a first column given a known value of a second column, and wherein the merging includes resolving column conflicts based on a higher directional strength value between columns of the first and second augmented datasets.

12. A system comprising:
a memory;
at least one processor in communication with the memory; and
program instructions executable by one or more processor via the memory to perform a method comprising:
processing a plurality of raw datasets for generating index metadata and associating one or more index defining the index metadata to respective ones of the plurality of raw datasets, wherein the respective ones of the plurality of raw datasets define respective metadata augmented datasets by the associating of the one or more index thereto, wherein the associating of the one or more index defining the index metadata to the respective ones of the plurality of raw datasets includes associating to the respective ones of the plurality of raw datasets a column association index that specifies a strength of column associations between columns of the respective ones of the plurality of raw datasets with respective strength values, wherein a strength value of a column association between a first column and a second column in a respective raw dataset is based on a frequency in which the first column and the second column appear together in a same dataset in a corpus of stored datasets having at least one of the first column or the second column;
examining augmented datasets of the metadata augmented datasets in dependence on metadata of the index metadata and in dependence on user defined input data specifying parameter values of a production dataset to be produced; and
merging first and second ones of the augmented datasets in selected groups of augmented datasets in dependence on the examining of the augmented datasets, wherein the merging of the first and second ones of the augmented datasets in dependence on the examining of the augmented datasets is performed in support of preparing the production dataset, and wherein the merging of the first and second ones of the augmented datasets is performed in dependence on an evaluation of the column association index of the first augmented dataset in reference to the column association index of the second augmented dataset.

13. The system of claim 12, wherein a strength value of a column association between a first column and a second column in a respective raw dataset is based on a determined capacity to predict values of the first column based on a value of the second column, and a capacity to derive a value of one of the first column and the second column based on a value of the other of the first column and the second column.

14. The system of claim 12, wherein the examining of the augmented datasets includes filtering out unqualified datasets and identifying qualified groups of augmented datasets that can be processed together for output of the production dataset.

15. The system of claim 12, wherein the method includes ranking qualified groups of augmented datasets, the ranking including scoring versions of each qualified group of augmented datasets based at least in part on column association strength values specified in the column association index of each respective dataset in the qualified group of augmented datasets, wherein the versions of the qualified group of augmented datasets are differentiated in terms of what columns are selected for merging from each dataset of the qualified group of augmented datasets.

16. The system of claim 12, wherein the merging of the first and second ones of the augmented datasets includes selecting a subset of columns from each of the first and second ones of the augmented datasets for merging according to a version of a selected group of augmented datasets in which the first and second ones of the augmented datasets belongs.

17. The system of claim 12, wherein the associating of the column association index to the respective ones of the plurality of raw datasets includes storing the column association index in persistent memory for subsequent reuse in examining datasets of the metadata augmented datasets.

18. The system of claim 12, wherein the column association index specifies strength values for a plurality of column pairs in each respective raw dataset, and wherein the examining of the augmented datasets includes selecting column pairs above a threshold strength value for inclusion in the merging.

19. The system of claim 12, wherein the method includes receiving a user input identifying one or more target columns for inclusion in the production dataset, and wherein the merging of the augmented datasets is performed in dependence on identifying datasets in which the target columns exhibit a strength value above a defined threshold in the column association index.

20. A computer program product comprising:
a computer readable storage medium readable by one or more processing circuit and storing instructions for execution by one or more processor for performing a method comprising:
processing a plurality of raw datasets for generating index metadata and associating one or more index defining the index metadata to respective ones of the plurality of raw datasets, wherein the respective ones of the plurality of raw datasets define respective metadata augmented datasets by the associating of the one or more index thereto, wherein the associating of the one or more index defining the index metadata to the respective ones of the plurality of raw datasets includes associating to the respective ones of the plurality of raw datasets a column association index that specifies a strength of column associations between columns of the respective ones of the plurality of raw datasets with respective strength values, wherein a strength value of a column association between a first column and a second column in a respective raw dataset is based on a frequency in which the first column and the second column appear together in a same dataset in a corpus of stored datasets having at least one of the first column or the second column;
examining augmented datasets of the metadata augmented datasets in dependence on metadata of the index metadata and in dependence on user defined input data specifying parameter values of a production dataset to be produced; and
merging first and second ones of the augmented datasets in selected groups of augmented datasets in dependence on the examining of the augmented datasets, wherein the merging of the first and second ones of the augmented datasets in dependence on the examining of the augmented datasets is performed in support of preparing the production dataset, and wherein the merging of the first and second ones of the augmented datasets is performed in dependence on an evaluation of the column association index of the first augmented dataset in reference to the column association index of the second augmented dataset.

* * * * *